(12) United States Patent
DeLeeuw et al.

(10) Patent No.: US 6,622,828 B1
(45) Date of Patent: Sep. 23, 2003

(54) CAM BUSHING FOR CAM BRAKING SYSTEM

(75) Inventors: William L. DeLeeuw, Rochester Hills, MI (US); David K. Pfister, Ortonville, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/287,081

(22) Filed: Apr. 6, 1999

(51) Int. Cl.⁷ ............................................. F16D 65/09
(52) U.S. Cl. .................... 188/206 R; 188/330; 384/275
(58) Field of Search ....................... 188/205 R, 206 R, 188/330, 341, 325; 384/275, 286, 295, 296, 289, 290, 291, 397, 322

(56) References Cited

U.S. PATENT DOCUMENTS

| | | | | |
|---|---|---|---|---|
| 2,163,090 A | * | 6/1939 | Harry ........................... 384/275 |
| 4,337,851 A | * | 7/1982 | Pringle ......................... 188/330 |
| 4,445,597 A | * | 5/1984 | Baltare ..................... 188/206 A |
| 4,452,347 A | * | 6/1984 | Dozier ......................... 188/330 |
| 4,576,488 A | * | 3/1986 | Steiner et al. ............... 384/291 |
| 4,701,061 A | * | 10/1987 | Stubbersfield ............... 384/484 |
| 6,089,361 A | * | 7/2000 | Davison et al. .......... 188/206 R |

\* cited by examiner

*Primary Examiner*—Pam Rodriguez
(74) *Attorney, Agent, or Firm*—Carlson, Gaskey & Olds

(57) ABSTRACT

A cam bushing assembly for supporting a camshaft in a cam braking system on a vehicle has a bushing retainer removable from a brake spider, and a bushing removable from the bushing retainer. The bashing retainer is bolted to the brake spider and can be removed simply by unfastening the bolts. A bushing is removably disposed within the bushing retainer. The bushing can be removed from the bushing retainer without removing the retainer from the brake spider. Further, the bushing assembly incorporates strategically located grooves that significantly increase lubricant flow to and around the camshaft.

39 Claims, 2 Drawing Sheets

CAM BUSHING FOR CAM BRAKING SYSTEM

BACKGROUND OF THE INVENTION

This invention generally relates to a cam bushing assembly for a cam braking system. More particularly, this invention relates to a removable, detachable multiple-component cam bushing assembly. The assembly fits on the brake spider as part of a cam braking system.

There are two main functions of a cam bushing assembly. The primary purpose of a cam bushing is to support the camshaft in a brake spider housing. A secondary purpose of a cam bushing assembly is to allow for lubrication of the camshaft so that it can freely rotate.

Broadly speaking, there are two known types of brake camshaft bushing assemblies. Each has its own disadvantages.

A first type has a bearing retainer portion either welded to a brake spider or formed integrally with the spider. The bushing is removably placed in the retainer. However, the retainer may sometimes wear, and require replacement. With this type of assembly, the entire spider must be replaced. Also, it is desirable to pivot the camshaft for removal. However, the camshaft cannot be pivoted in a non-removable retainer. Thus, to remove the camshaft in this type of assembly, the wheel hub must be removed. This is undesirable.

A second type of bearing assembly has a one-piece retainer/bushing bolted to the spider. With this assembly, the bushing is integral to the retainer and cannot be removed. This is undesirable since it would be cheaper to simply replace the bushing. Also, the retainer is typically bolted to the spider with a closely controlled torque. It would be desirable to not need to replace the retainer, and achieve the torque load every time the bushing wears.

One other disadvantage of the single piece cam bushing is insufficient flow of lubrication to the camshaft. The use of the fixed components makes formation of lubricant passages quite difficult.

SUMMARY OF THE INVENTION

The cam bushing assembly of the present invention overcomes the above problems of single piece cam bushings. In general terms, this invention discloses a cam bushing assembly that includes a bushing retainer having an aperture and a bushing disposed within the aperture. The bushing retainer is removably attached to the brake spider and the bushing is removably attached to the retainer.

The bushing assembly is serviceable in several ways. The bushing itself can be removed from the retainer without removing the retainer from the brake spider. This is advantageous because the bolts that fasten the retainer to the brake spider, which are torqued to a predetermined value, do not have to be removed. Alternatively, the whole bushing assembly can be removed by unfastening the bolts. Since each component is individually removable, maintenance costs and time are minimal.

These and other features of this invention can be best understood from the following specification and drawings. Moreover, the use of the two removable components facilitates the inclusion of lubricant grooves. Thus, the present invention also ensures good lubricant flow.

As further shown in FIG. 1, the bushing 24 has a width 70 less than the width 72 of the bushing retainer 22. Therefore, when assembled, the bushing 24 does not contact the entire inner retainer surface 36 of the bushing retainer 22, and a non-contacting surface 76 is provided on the opposing sides of the bushing 24. An annular seal 74 is secured on the non-contacting surface 76, creating a lubrication reserve 78 between the seal 74 and the bushing 24. The reserve 78 retains the lubricant proximate to the bushing 24, and the seal 74 prevents the lubricant from flowing away from the bushing 24.

DETAILED DESCRIPTION OF THE PREFERRED EMBODIMENT

Figure 1:
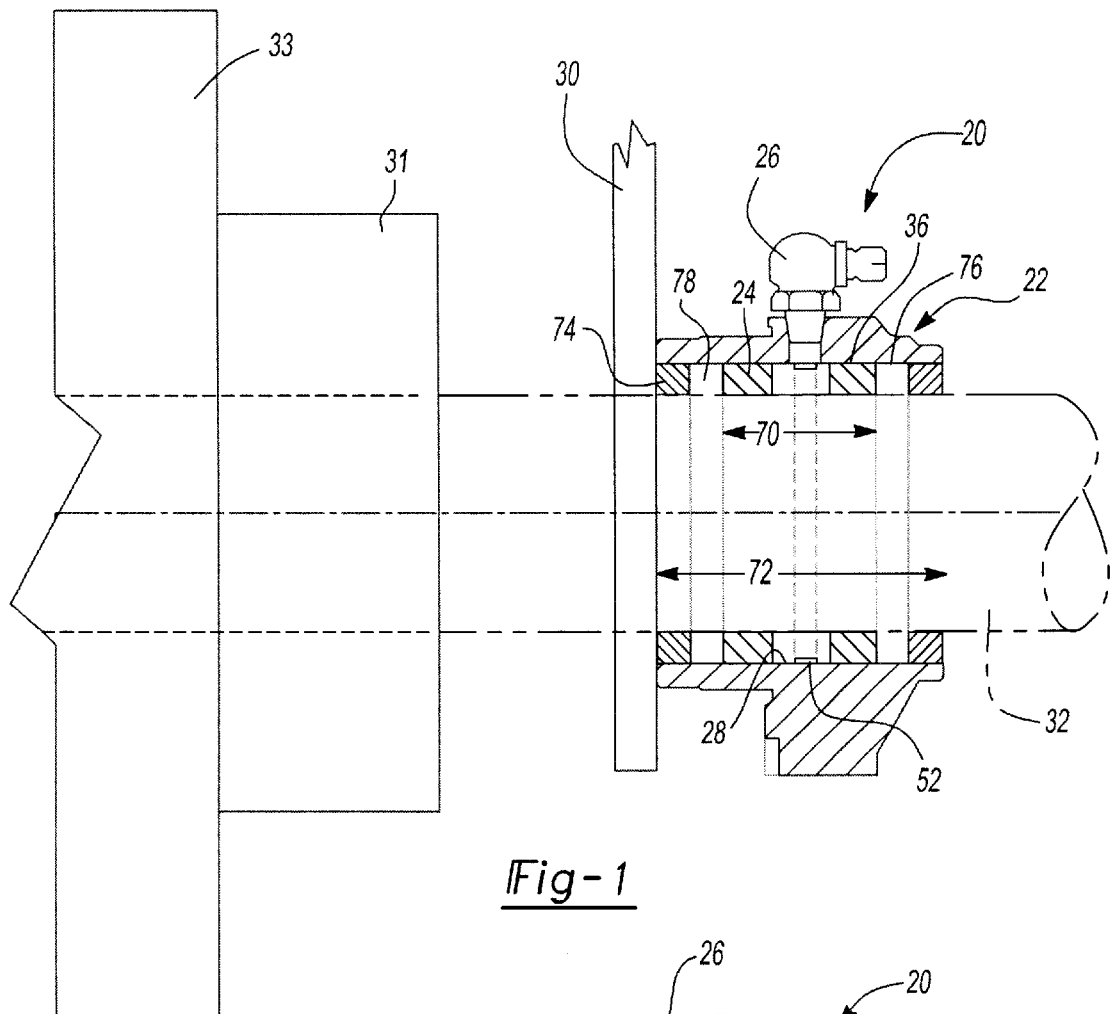
FIG. 1 is a side view of a system designed according to this invention.

FIG. 1 schematically illustrates a cam bushing assembly, generally shown at 20. The bushing assembly 20 includes a bushing retainer 22, a bushing 24, and a grease fitting 26. The bushing retainer 22 has an aperture 28 in which the bushing 24 is placed. As will be described below, the bushing retainer 22 is removably attached to a brake spider 30.

The primary purpose for the bushing assembly 20 is to support the brake camshaft 32, shown in phantom. As known, a brake camshaft 32 drives a brake cam 31, shown schematically. This particular bushing assembly 20 is preferably used as the camshaft support closest to the wheel hub 33.

Figure 2:
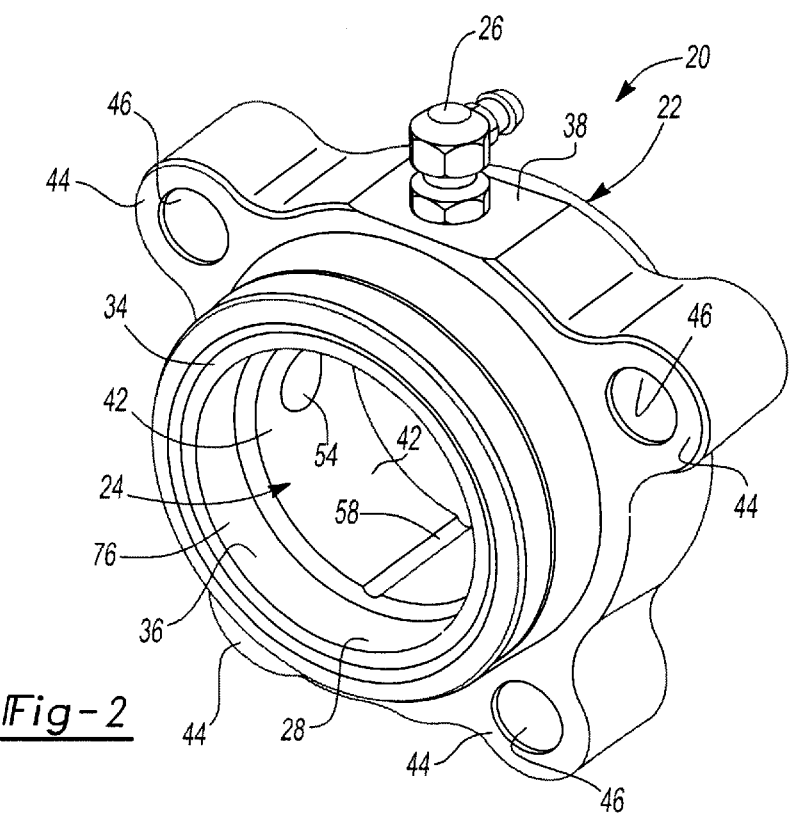
FIG. 2 is a perspective view of a system designed according to this invention.

As shown in FIG. 2, bushing assembly 20 has a longitudinal axis and transverse axis. The retainer aperture 28 preferably extends along the longitudinal axis. Further, the aperture 28 forms a retainer side wall 34 having an inner retainer surface 36 and an outer retainer surface 38. The bushing is preferably cylindrically shaped having an outer circumference surface 40 and an interior surface 42.

Figure 3:
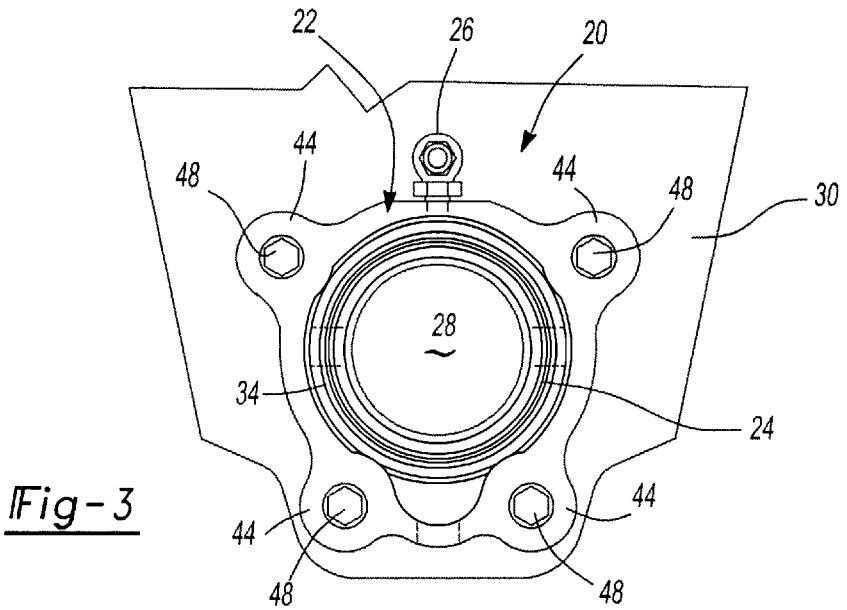
FIG. 3 is a front view of a system designed according to this invention.

The retainer 22 preferably has four flanges 44 each having a hole 46. As shown in FIG. 3, preferably bolts 48 are received within the holes 46 for bolting the retainer 22 to the brake spider 30.

Figure 4:
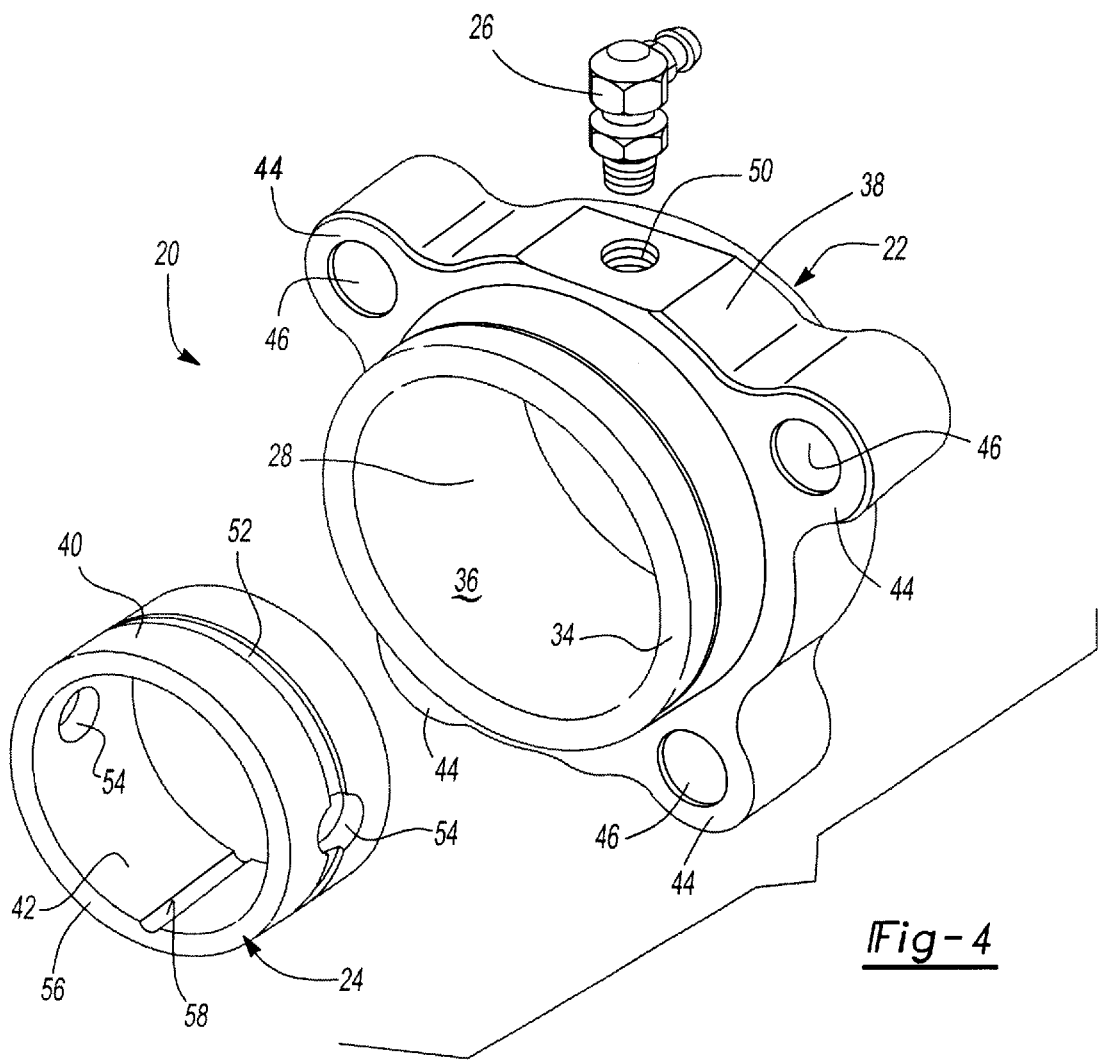
FIG. 4 is an exploded perspective view of a system designed according to this invention.

As best shown in FIG. 4, the retainer 22 has a hole 50 that extends along the transverse axis through the retainer side wall 34 from the outer retainer surface 38 to the inner retainer surface 36 to the retainer aperture 28. The hole 50 allows for the flow of a lubricant into the aperture 28 to lubricate the camshaft 32. A grease fitting 26 is received within the retainer hole 50 to guide the lubricant into the retainer aperture 28.

The outer circumference 40 of the bushing 24 is adjacent the inner retainer surface 36 when the bushing 24 is disposed within the retainer 22. The bushing 24 has a groove 52 extending along its outer circumference 40 that is aligned with the retainer hole 50. As shown in FIG. 4, the groove 52 extends completely and continually around the outer circumference 40 of the bushing 24. The groove 52 receives the lubricant from the grease fitting 26 and further allows for the flow of the lubricant. Returning to FIG. 1, the grease fitting 26 is positioned over the groove 52 that extends around the outer circumference of the busing 24, supplying lubricant directly into the groove 52. As further shown in FIG. 1, the grease fitting 26 is positioned approximately in the center of the width 72 of the bushing retainer 22.

The bushing 24 also has at least one outlet hole 54 that is aligned with the circumferential groove 52. The outlet hole 54 extends along a transverse axis through the bushing wall 56 and allows for release of the lubricant from the circumferential groove 52 into the aperture 28. The outlet hole or holes 54 are preferably spaced apart from the retainer hole 50.

The bushing 24 also has at least one groove 58 and preferably two, on its interior surface 42 extending along the longitudinal axis to further facilitate the flow of the lubricant around the cam shaft 32. The groove or grooves 58 are preferably spaced by 90° from the outlet holes 54.

The bushing 24 is removably connected to the retainer 22. Preferably, it is pressed in the bushing retainer 22 creating an interference fit. The bushing 24 can be pressed out from the retainer 22, thus leaving the retainer 22 in place. This allows for reduced maintenance costs. The bushing 24 can be removed for maintenance, replacement, or for access to the camshaft. As mentioned above, since bushing 24 can be removed without removing retainer 22, the torque on the retainer bolts can be maintained.

In the prior art, when using non-removable retainers, the wheel hubs 33 needed to be removed to remove camshaft 32. Also, the retainers 22 will sometimes wear with non-removable retainers. This required replacement of the entire spider. For this reason, it is desirable to have both a removable bushing and a removable retainer. The present invention is the first to provide the combination.

Both the bushing retainer 22 and the bushing 24 are preferably formed from powdered metal. The bushing retainer 22 preferably consists of carbon steel, whereas, the bushing 24 preferably consists of a high copper content ferrous alloy.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A cam bushing assembly for a cam braking system comprising:
   a removable bushing retainer having an aperture forming a side wall having an inner retainer surface and an outer retainer surface, said retainer having a hole extending through said side wall from said outer retainer surface to said inner retainer surface into said aperture allowing for flow of a lubricant into said aperture; and
   a bushing removably connected to said retainer having an interior bore for supporting a camshaft disposed within said aperture and a groove extending around an outer circumference of said bushing aligned with said hole of said retainer when said bushing is disposed within said retainer, and said hole is positioned over said groove to supply said lubricant directly in said groove to allow flow of said lubricant introduced through said hole.

2. The assembly of claim 1, wherein said bushing retainer and said bushing are made of metal.

3. The assembly of claim 2, wherein said bushing retainer and said bushing are made of powdered metal.

4. The assembly of claim 1, further comprising a brake spider, said brake spider being mounted to support a brake cam, and said bushing retainer being removably connected to said brake spider.

5. The assembly of claim 4, wherein said bushing retainer has at least one flange having a hole.

6. The assembly of claim 5, wherein said bushing retainer is bolted to said brake spider by at least one bolt received in said retainer flange hole.

7. The assembly of claim 6, wherein said bushing retainer has four flanges each having a hole, said retainer is bolted to said brake spider with four bolts, wherein each bolt is received within one of said four retainer flange holes.

8. The assembly of claim 7, wherein said retainer has a longitudinal axis and a transverse axis, said aperture extends along said longitudinal axis.

9. The assembly of claim 8, wherein said hole extends along said transverse axis.

10. The assembly of claim 1, further comprising a grease fitting received within said hole through said side wall of said retainer, said grease fitting further facilitates the flow of lubricant into said retainer aperture.

11. The assembly of claim 1, wherein said bushing is cylindrical in shape and said outer circumference is adjacent said inner retainer surface of said aperture when said bushing is disposed within said retainer; and said bushing has at least one outlet hole extending through said bushing from said outer circumference to said interior bore, said outlet hole being aligned with said groove for release of the lubricant into said aperture.

12. The assembly of claim 11, wherein said at least one outlet hole in said bushing is spaced apart from said hole in said retainer.

13. The assembly of claim 12, wherein said bushing has at least one groove on said interior bore extending along a longitudinal axis allowing flow of the lubricant.

14. A cam assembly for a cam braking system comprising:
   a brake spider for supporting and facilitating lubrication of a cam shaft portion of a cam brake;
   a cam mounted adjacent said spider;
   a bushing retainer having an aperture along a longitudinal axis, at least one flange having a flange hole for receiving a bolt to bolt said retainer to said brake spider and allowing said retainer to be removably connected to said brake spider, said retainer having a hole facilitating the flow of a lubricant into said aperture; and
   a bushing removably connected to said retainer and generally cylindrical in shape and having an outer circumference, an interior surface, and a groove extending around an outer circumference of said bushing aligned with said hole of said retainer when said bushing is disposed within said retainer, and said hole is positioned over said groove to supply said lubricant directly in said groove to allow flow of said lubricant introduced through said hole, and said bushing is pressed into said aperture creating an interference fit.

15. An assembly as set forth in claim 14, wherein said bushing has a groove extending around said outer circumference, said groove aligned with said hole in said retainer for receiving lubricant introduced through said retainer hole.

16. An assembly as set forth in claim 15, wherein said bushing has at least one outlet hole extending through said bushing from said outer circumference to said interior surface along a transverse axis for release of the lubricant into said aperture, said at least one outlet hole being spaced apart from said retainer hole.

17. An assembly as set forth in claim 16, wherein said bushing has at least one groove along the longitudinal axis on said interior surface, said at least one groove further allows for the flow of the lubricant.

18. An assembly as set forth in claim 14, wherein said bushing and said retainer are formed of powdered metal.

19. An assembly as set forth in claim 14, wherein there are four of said at least one flange and said at least one hole in said flange.

20. A cam bushing assembly for a cam braking system comprising:

a removable bushing retainer having an aperture forming a side wall having an inner retainer surface and an outer retainer surface and a hole extending through said side wall from said outer retainer surface to said inner retainer surface into said aperture allowing for flow of a lubricant into said aperture;

a bushing removably connected to said retainer having an interior bore for supporting a camshaft disposed within said aperture, and a groove extending around an outer circumference of said bushing, and a grease fitting received within said hole of said retainer to further facilitate flow of said lubricant into said aperture, and positioned over said groove to supply said lubricant directly in said groove.

21. The assembly as recited in claim 20 wherein said grease fitting is positioned approximately in a center of a width of the bushing retainer.

22. A cam bushing assembly for a cam braking system comprising:

a removable bushing retainer having an aperture forming a side wall having an inner retainer surface and an outer retainer surface and a hole extending through said side wall from said outer retainer surface to said inner retainer surface into said aperture allowing for flow of a lubricant into said aperture; and a bushing removably connected to said retainer and cylindrical shape and having an interior bore for supporting a camshaft disposed within said aperture, an outer circumference adjacent said inner retainer surface of said aperture when said bushing is disposed within said retainer, a groove extending completely and continually around said outer circumference and aligned with said hole of said retainer when said bushing is disposed within said retainer to allow flow of said lubricant introduced through said hole, and at least one outlet hole extending through said bushing from said outer circumference to said interior bore which is aligned with said groove for release of said lubricant into said aperture.

23. A cam bushing assembly for a cam braking system comprising:

a removable bushing retainer having an aperture forming a side wall having an inner retainer surface and an outer retainer surface and a hole extending through said side wall from said outer retainer surface to said inner retainer surface into said aperture allowing for flow of a lubricant into said aperture; and a bushing removably connected to said retainer and cylindrical in shape having an interior bore for supporting a camshaft disposed within said aperture, an outer circumference adjacent said inner retainer surface of said aperture when said bushing is disposed within said retainer, a groove extending around said outer circumference aligned with said hole of said retainer when said bushing is disposed within said retainer to further allow flow of said lubricant introduced through said hole, at least one outlet hole spaced apart from said hole in said retainer and extending through said bushing from said outer circumference to said interior bore and aligned with said groove for release of said lubricant into said aperture, and at least one bore groove on said interior bore extending along a longitudinal axis and spaced 90° from said outlet hole to allow flow of said lubricant.

24. A cam assembly for a cam braking system comprising:

a brake spider for supporting and facilitating lubrication of a cam shaft portion of a cam brake;

a cam mounted adjacent said spider;

a bushing retainer having an aperture along a longitudinal axis and at least one flange having a flange hole for receiving a bolt to bolt said retainer to said brake spider and allowing said retainer to be removably connected to said brake spider, said retainer having a hole facilitating the flow of a lubricant into said aperture;

a bushing removably connected to said retainer being generally cylindrical in shape and having an outer circumference, an interior surface, a groove extending around said outer circumference of said bushing and aligned with said hole in said retainer, for release said lubrication introduced through said hole, said bushing being pressed into said aperture creating an interference fit; and a grease fitting positioned over said groove to supply lubricant directly in said groove.

25. The assembly as recited in claim 24 wherein said grease fitting is positioned approximately in a center of a width of the bushing retainer.

26. A cam assembly for a cam braking system comprising:

a brake spider for supporting and facilitating lubrication of a cam shaft portion of a cam brake;

a cam mounted adjacent said spider;

a bushing retainer having an aperture along a longitudinal axis and at least one flange having a flange hole for receiving a bolt to bolt said retainer to said brake spider and allowing said retainer to be removably connected to said brake spider, said retainer having a hole facilitating the flow of a lubricant into said aperture;

a bushing removably connected to said retainer being generally cylindrical in shape and having an outer circumference, an interior surface, a groove extending completely and continually around said outer circumference and aligned with said hole in said retainer for receiving said lubricant introduced through said hole, said bushing being pressed into said aperture creating an interference fit.

27. A cam assembly for a cam braking system comprising:

a brake spider for supporting and facilitating lubrication of a cam shalt portion of a cam brake;

a cam mounted adjacent said spider;

a bushing retainer having an aperture along a retainer longitudinal axis and at least one flange having a flange hole for receiving a bolt to bolt said retainer to said brake spider and allowing said retainer to be removably connected to said brake spider, said retainer having a hole facilitating the flow of a lubricant into said aperture;

a bushing removably connected to said retainer being generally cylindrical in shape and having an outer circumference, an interior surface, a bushing longitudinal axis, a groove extending around said outer circumference and aligned with said hole in said retainer for receiving said lubricant introduced through said hole, at least one outlet hole spaced apart from said hole extending through said bushing from said outer circumference to said interior surface along a transverse axis for release of said lubricant into said aperture, and at least one bore groove extending along said bushing longitudinal axis on said interior surface and spaced 90° from said outlet hole to further allow for flow of said lubricant, said bushing being pressed into said retainer aperture creating an interference fit.

28. A cam bushing assembly for a cam braking system comprising:
   a removable bushing retainer having a retainer width, a longitudinal axis, a transverse axis, an aperture extending along said longitudinal axis and having a first retainer end and a second opposing retainer end, said aperture forming a side wall having an inner retainer surface and an outer retainer surface, and a hole extending through said side wall from said outer retainer surface to said inner retainer surface into said aperture allowing for flow of a lubricant into said aperture, and said hole is located between said first retainer end and said second retainer end of said bushing retainer, and said retainer width is defined as a retainer distance from said first retainer end of said aperture to said second retainer end of said aperture as taken along said longitudinal axis; and
   a bushing removably connected to said retainer having a bushing width, a first bushing end, an opposing second bushing end, and an interior bore for supporting a camshaft disposed within said aperture, and said bushing width is defined as a bushing distance from said first bushing end to said second bushing end as taken along said longitudinal axis, and said bushing width is less than said retainer width.

29. The assembly of claim 28, further comprising a brake spider, said brake spider being mounted to support a brake cam, and said bushing retainer being removably connected to said brake spider.

30. The assembly of claim 29, wherein said bushing retainer has four flanges each having a hole, said retainer is bolted to said brake spider with four bolts, wherein each bolt is received within one of said four retainer flange holes.

31. The assembly of claim 28, further comprising a grease fitting received within said hole through said side wall of said retainer, said grease fitting further facilitates the flow of lubricant into said retainer aperture.

32. The assembly of claim 28, wherein said bushing is cylindrical in shape having an outer circumference and said interior bore, said bushing outer circumference is adjacent said inner retainer surface of said aperture when said bushing is disposed within said retainer;
   said bushing having a groove extending around said outer circumference aligned with said hole through said side wall of said retainer when said bushing is disposed within said retainer, said groove further allows flow of a lubricant introduced through said hole, said bushing having at least one outlet hole extending through said bushing from said outer circumference to said interior bore, said outlet hole being aligned with said groove for release of the lubricant into said aperture.

33. The assembly of claim 32, wherein said at least one outlet hole in said bushing is spaced apart from said hole in said retainer.

34. The assembly of claim 32, wherein said bushing has at least one groove on said interior bore extending along said longitudinal axis allowing flow of the lubricant.

35. The assembly of claim 28, wherein a seal is secured to said retainer creating a lubrication reserve between said seal and a bushing edge of said bushing.

36. A cam bushing assembly for a cam braking system comprising:
   a removable bushing retainer having a retainer width, a longitudinal axis, a transverse axis, an aperture extending along said longitudinal axis forming a side wall having an inner retainer surface and an outer retainer surface, and a hole extending through said side wall from said outer retainer surface to said inner retainer surface into said aperture allowing for flow of a lubricant into said aperture;
   a bushing removably connected to said retainer having a bushing width less than said retainer width and an interior bore for supporting a camshaft disposed within said aperture; and
   a grease fitting positioned approximately in a center of said retainer width of said bushing retainer and received within said hole through said side wall of said retainer to further facilitate flow of said lubricant into said aperture to supply said lubricant directly in a groove extending around said outer circumference of said bushing.

37. A cam bushing assembly for a cam braking system comprising:
   a removable bushing retainer having a retainer width, a longitudinal axis, a transverse axis, an aperture extending along said longitudinal axis forming a side wall having an inner retainer surface and an outer retainer surface, and a hole extending through said side wall from said outer retainer surface to said inner retainer surface into said aperture allowing for flow of a lubricant into said aperture; and
   a bushing removably connected to said retainer and cylindrical in shape having a bushing width less than said retainer width, an interior bore for supporting a camshaft disposed within said aperture, an outer circumference adjacent said inner retainer surface of said aperture when said bushing is disposed within said retainer, a groove extending completely and continually around said outer circumference aligned with said hole of said retainer when said bushing is disposed within said retainer to further allow flow of said lubricant introduced through said hole, and at least one outlet hole extending through said bushing from said outer circumference to said interior bore aligned with said groove for release of said lubricant into said aperture.

38. A cam bushing assembly for a cam braking system comprising:
   a removable bushing retainer having a retainer width, a retainer longitudinal axis, a transverse axis, an aperture extending along said longitudinal axis forming a side wall having an inner retainer surface and an outer retainer surface, and a hole extending through said side wall from said outer retainer surface to said inner retainer surface into said aperture allowing for flow of a lubricant into said aperture; and
   a bushing removably connected to said retainer and cylindrical in shape having a bushing width less than said retainer width, an interior bore for supporting a camshaft disposed within said aperture, a bushing longitudinal axis, an outer circumference adjacent said inner retainer surface of said aperture when said bushing is disposed within said retainer, a groove extending around said outer circumference aligned with said hole through said side wall when said bushing is disposed within said retainer to further allow flow of said lubricant introduced through said hole, at least one outlet hole extending through said bushing from said outer circumference to said interior bore aligned with said groove for release of said lubricant into said aperture, and at least one bore groove on said interior bore extending along said retainer longitudinal axis and spaced 90° from said outlet hole allowing flow of the lubricant.

39. A cam bushing assembly for a cam braking system comprising:

a removable bushing retainer having a retainer width, a longitudinal axis, a transverse axis, an aperture extending along said longitudinal axis and having a first retainer end and a second opposing retainer end, said aperture forming a side wall having an inner retainer surface and an outer retainer surface, and a hole extending through said side wall from said outer retainer surface to said inner retainer surface into said aperture allowing for flow of a lubricant into said aperture, and said retainer width is defined as a retainer distance from said first retainer end of said aperture to said second retainer end of said aperture;

a bushing removably connected to said retainer having a bushing width and an interior bore having a first bushing end and an opposing second bushing end for supporting a camshaft disposed within said aperture, and said bushing width is defined as a bushing distance from said first bushing end to said second bushing end, and said bushing width is less than said retainer width; and a grease fitting received within said hole through said side wall of said retainer, and said grease fitting further facilitates the flow of lubricant into said retainer aperture, and said grease fitting is positioned over a groove extending around said outer circumference of said bushing to supply said lubricant directly in said groove.

* * * * *